United States Patent
Lovseth et al.

(10) Patent No.: US 11,724,818 B2
(45) Date of Patent: Aug. 15, 2023

(54) PHASED ARRAY TRANSMISSION REFLECTED OFF ROTOR BLADE TO TARGET

(71) Applicant: Rockwell Collins, Inc., Cedar Rapids, IA (US)

(72) Inventors: Jonathan A. Lovseth, Marion, IA (US); Joseph T. Graf, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 388 days.

(21) Appl. No.: 17/027,594

(22) Filed: Sep. 21, 2020

(65) Prior Publication Data

US 2022/0089292 A1   Mar. 24, 2022

(51) Int. Cl.
   *B64D 43/00*   (2006.01)
   *G01S 3/46*    (2006.01)
   *H01Q 1/28*    (2006.01)

(52) U.S. Cl.
   CPC ............... *B64D 43/00* (2013.01); *G01S 3/46* (2013.01); *H01Q 1/28* (2013.01)

(58) Field of Classification Search
   CPC .................................................... B64D 43/00
   See application file for complete search history.

(56) References Cited

U.S. PATENT DOCUMENTS

| | | | |
|---|---|---|---|
| 4,237,462 A | 12/1980 | Lemke et al. | |
| 6,054,947 A | 4/2000 | Kosowsky | |
| 7,728,756 B2 * | 6/2010 | Krikorian | G01S 7/4026 342/25 R |
| 8,384,605 B2 | 2/2013 | Finn et al. | |
| 10,439,293 B2 | 10/2019 | Jones | |
| 10,771,135 B2 * | 9/2020 | Sheldon | H04B 7/0617 |
| 2009/0051585 A1 | 2/2009 | Krikorian et al. | |
| 2014/0349637 A1 * | 11/2014 | Hyde | H01Q 3/00 455/419 |
| 2017/0223749 A1 | 8/2017 | Sheldon et al. | |

FOREIGN PATENT DOCUMENTS

GB   2517659 B   7/2015

OTHER PUBLICATIONS

Extended Search Report in European Application No. 21196798.9 dated Feb. 22, 2022, 13 pages.

* cited by examiner

*Primary Examiner* — Michael A Berns
(74) *Attorney, Agent, or Firm* — Suiter Swantz pc llo (57) ABSTRACT

A system including an aircraft. A phased array may be configured to transmit electromagnetic (EM) energy toward rotor blades and receive EM energy in a direction from the rotor blades. A processor may be configured to: determine or obtain rotor blade information; determine or obtain aircraft information; based on the rotor blade information and the aircraft information, determine (a) a time to transmit EM energy or receive EM energy and (b) an angle to transmit EM energy or receive EM energy; and based on the rotor blade information and the aircraft information, control the phased array to adjust a beam pointing angle and to transmit EM energy for a duration at the beam pointing angle. The phased array may be configured to transmit EM energy for the duration at the beam pointing angle, wherein the transmitted EM energy is configured to reflect off a rotor blade toward a target.

15 Claims, 10 Drawing Sheets

PHASED ARRAY TRANSMISSION REFLECTED OFF ROTOR BLADE TO TARGET

BACKGROUND

Antenna placement for line-of-sight radio links can be expensive on military and commercial rotary wing platforms. Rotary aircraft have large rotors, often overhead, that can disturb line-of-sight from antenna apertures placed on the aircraft body.

SUMMARY

In one aspect, embodiments of the inventive concepts disclosed herein are directed to a system. The system may include an aircraft. The aircraft may include a rotor having rotor blades, a phased array, and processor communicatively coupled to the phased array. The phased array may be configured to at least one of transmit electromagnetic (EM) energy in a direction toward the rotor blades or receive EM energy in a direction from the rotor blades. The processor may be configured to: at least one of determine or obtain rotor blade information, the rotor blade information including at least one location of the rotor blades; at least one of determine or obtain aircraft information, the aircraft information including a position and an orientation of the aircraft; based at least on the rotor blade information and the aircraft information, determine (a) at least one time to at least one of transmit EM energy or receive EM energy and (b) at least one angle to at least one of transmit EM energy or receive EM energy; and based at least on the rotor blade information and the aircraft information, control the phased array to adjust at least one beam pointing angle of the phased array to one or more of the at least one angle and to transmit EM energy for a particular duration at the at least one adjusted beam pointing angle. The phased array may be configured to transmit EM energy for the particular duration at the at least one adjusted beam pointing angle, wherein the transmitted EM energy is configured to reflect off at least one of the rotor blades toward at least one target.

In a further aspect, embodiments of the inventive concepts disclosed herein are directed to a method. The method may include: by a phased array, at least one of transmitting electromagnetic (EM) energy in a direction toward rotor blades or receiving EM energy in a direction from the rotor blades, wherein an aircraft includes the phase array, at least one rotor, and at least one processor communicatively coupled to the phased array, wherein the at least one rotor has the rotor blades; by the at least one processor, at least one of determining or obtaining rotor blade information, the rotor blade information including at least one location of the rotor blades; by the at least one processor, at least one of determining or obtaining aircraft information, the aircraft information including a position and an orientation of the aircraft; by the at least one processor, based at least on the rotor blade information and the aircraft information, determining (a) at least one time to at least one of transmit EM energy or receive EM energy and (b) at least one angle to at least one of transmit EM energy or receive EM energy; by the at least one processor, based at least on the rotor blade information and the aircraft information, controlling the phased array to adjust at least one beam pointing angle of the phased array to one or more of the at least one angle and to transmit EM energy for a particular duration at the at least one adjusted beam pointing angle; and by the phased array, transmitting EM energy for the particular duration at the at least one adjusted beam pointing angle, wherein the transmitted EM energy is configured to reflect off at least one of the rotor blades toward at least one target.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein may be directed to a method and a system (e.g., an aircraft system) including a phased array configured to at least one of transmit electromagnetic (EM) energy in a direction toward the rotor blades or receive EM energy in a direction from the rotor blades, wherein the transmitted and/or received EM energy at least one of dodges the rotor blades or reflects off the rotor blades. For example, EM energy may dodge the rotor blades for satellite communication (SATCOM) and/or high-altitude command, control, communications, computers, intelligence, surveillance, and reconnaissance (C4ISR) platforms. For example, the EM energy may reflect off the rotor blades for communication with surface communication targets and/or for ground radar operations.

Some embodiments may reduce cost by allowing for use of a single phased array on an aircraft as compared to current aircraft that have first phased array on a top of the aircraft and a second phased array on the bottom of the aircraft. Some embodiments may increase visibility at wide scan angles. Some embodiments may provide multifunction radiofrequency (RF) capabilities for SATCOM links, air-to-ground communications, landing zone terrain radar (e.g., which may be useful for brown-out conditions), and/or target radar (e.g., mobile or stationary targets).

Referring now to FIGS. 1-4, an exemplary embodiment of a system 100 according to the inventive concepts disclosed herein is depicted. In some embodiments, the system may include at least one aircraft 102 (e.g., a helicopter or an aircraft having a propeller), at least one radar target 112 (e.g., a terrain feature, a water feature, a structure, and/or a surface vehicle), at least one communication target 114 (e.g., having a communication radio; e.g., a man pack radio, a vehicle radio (e.g., an automobile radio, a watercraft radio, or an aircraft radio), or a stationary radio), at least one mobile radar target 116, 118 (e.g., a vehicular radar target or a munition radar target), and/or at least one satellite target 120, some or all of which may be communicatively coupled at any given time.

In some embodiments, the aircraft 102 may include a spine 104, at least one rotor 106, and/or at least one phased array 110. In some embodiments, the phased array 110 may be positioned on the spine 104 of the aircraft 102. In some embodiments, the phased array 110 may be a radiofrequency (RF) phased array or an optical phased array. The rotor 106 may include rotor blades 108.

Figure 1:
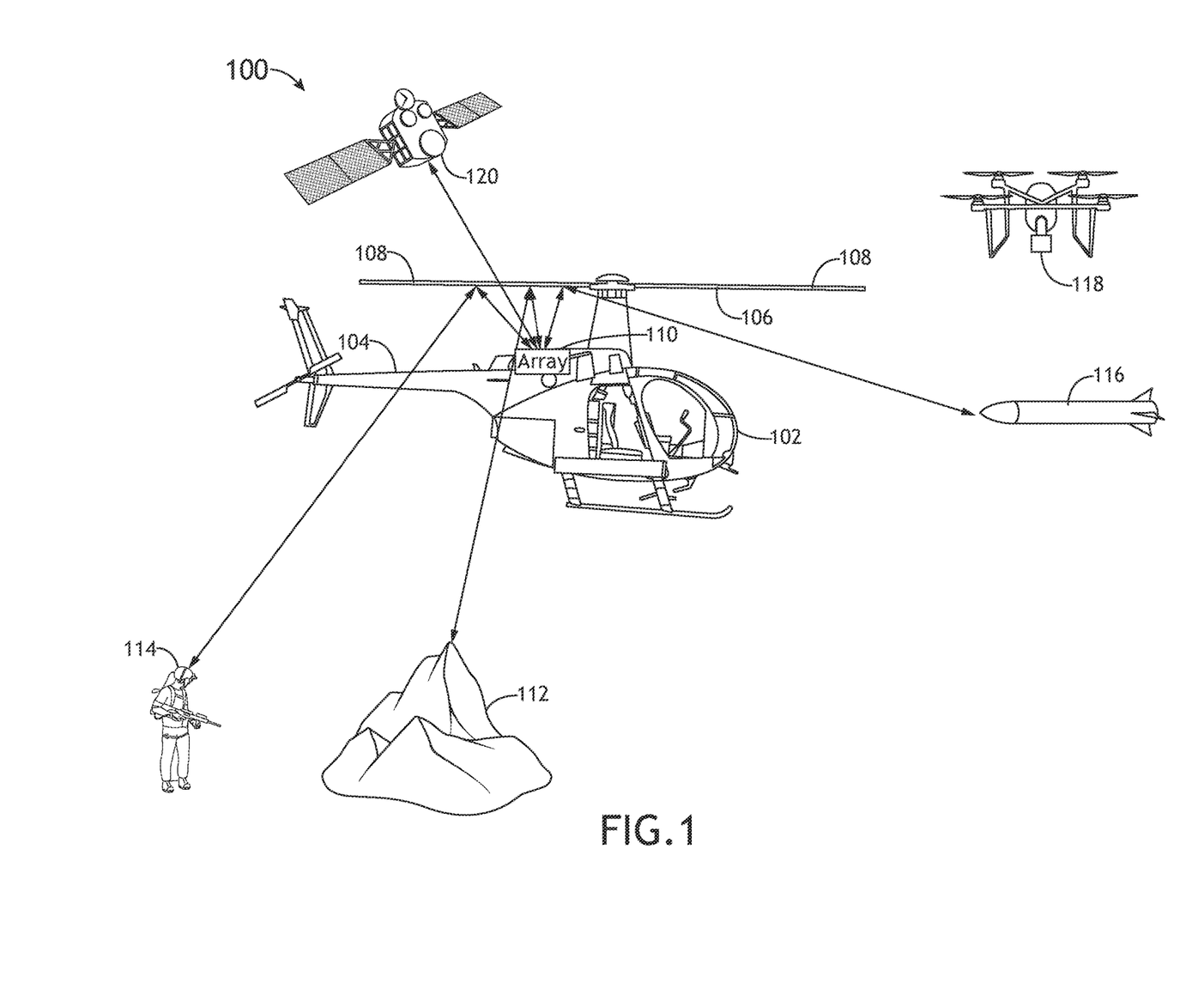
FIG. 1 is a view of an exemplary embodiment of a system according to the inventive concepts disclosed herein.
Figure 2:
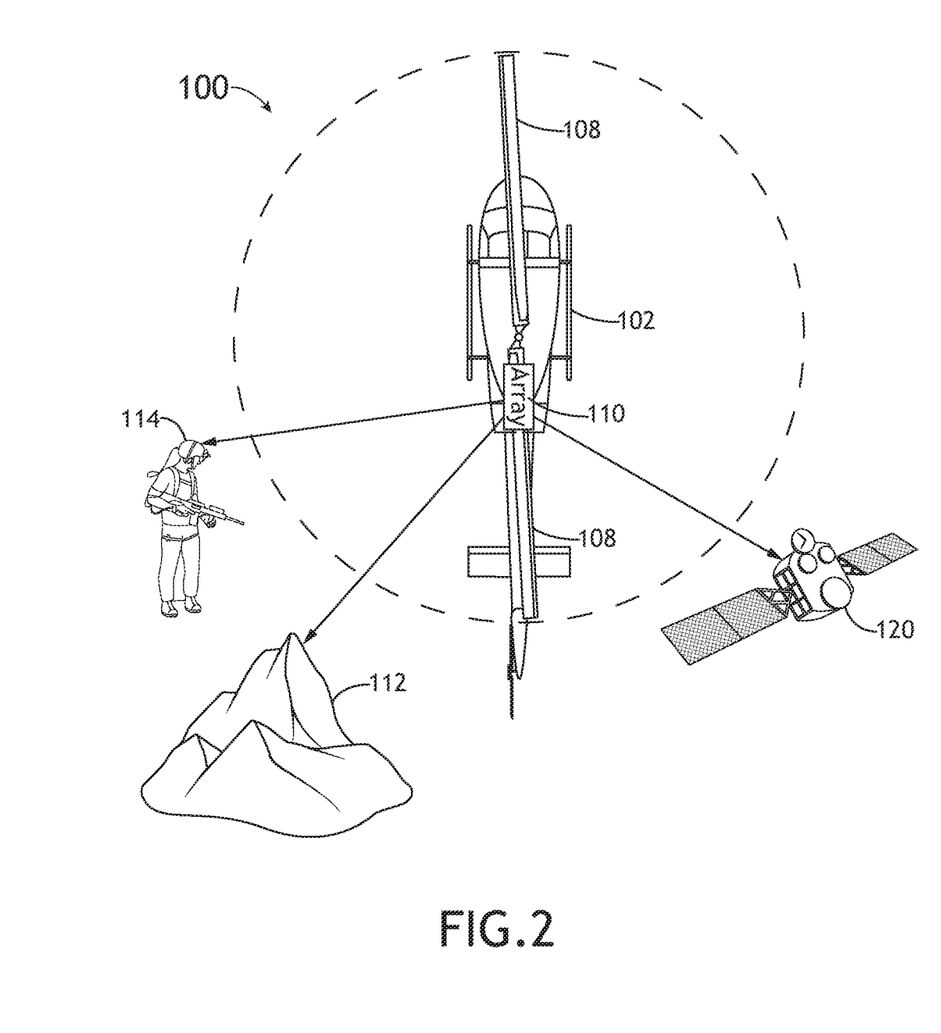
FIG. 2 is a view of an exemplary embodiment of the system of FIG. 1 according to the inventive concepts disclosed herein.
Figure 3:
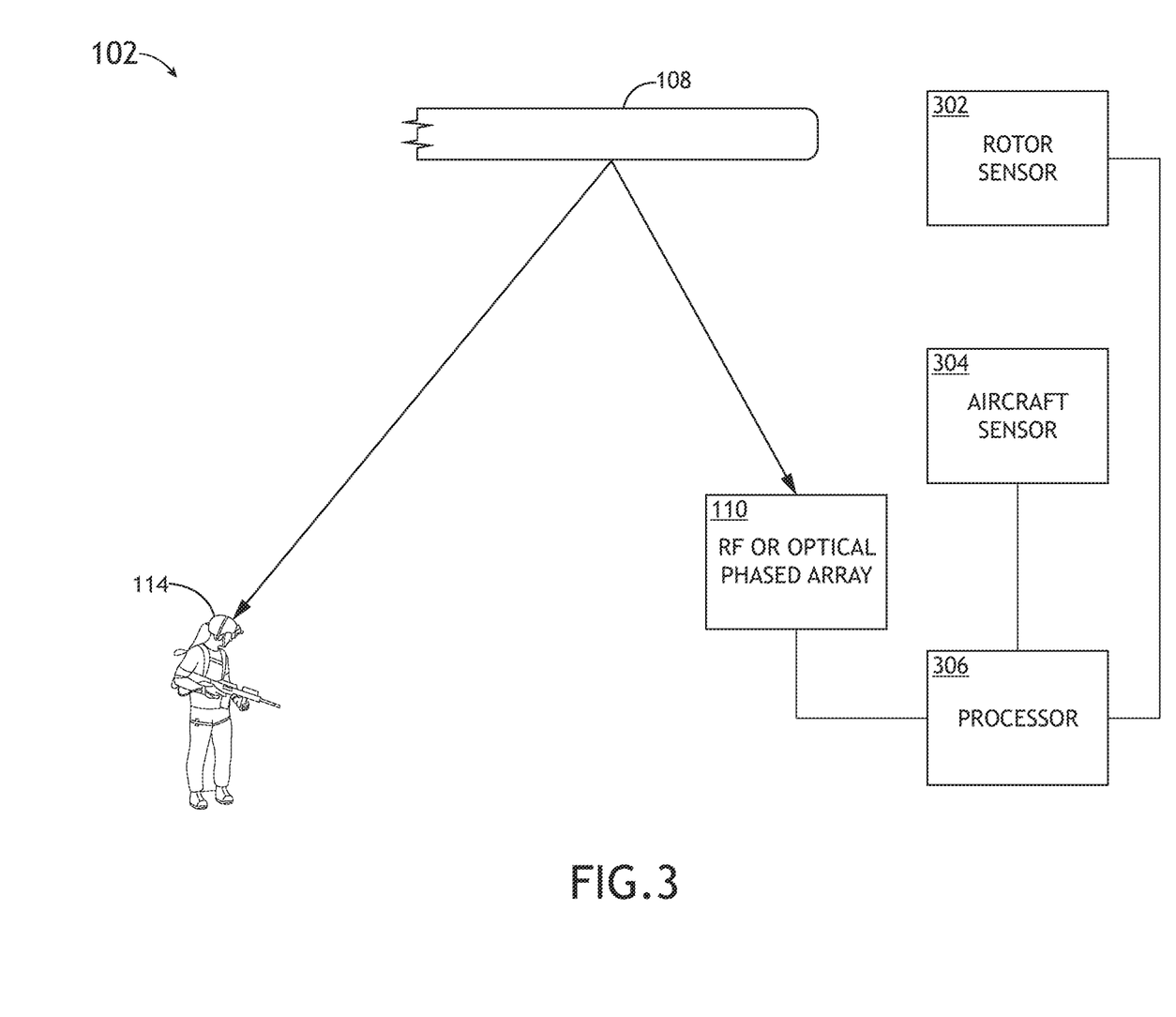
FIG. 3 is a view of an exemplary embodiment of the system of FIG. 1 according to the inventive concepts disclosed herein.
Figure 4:
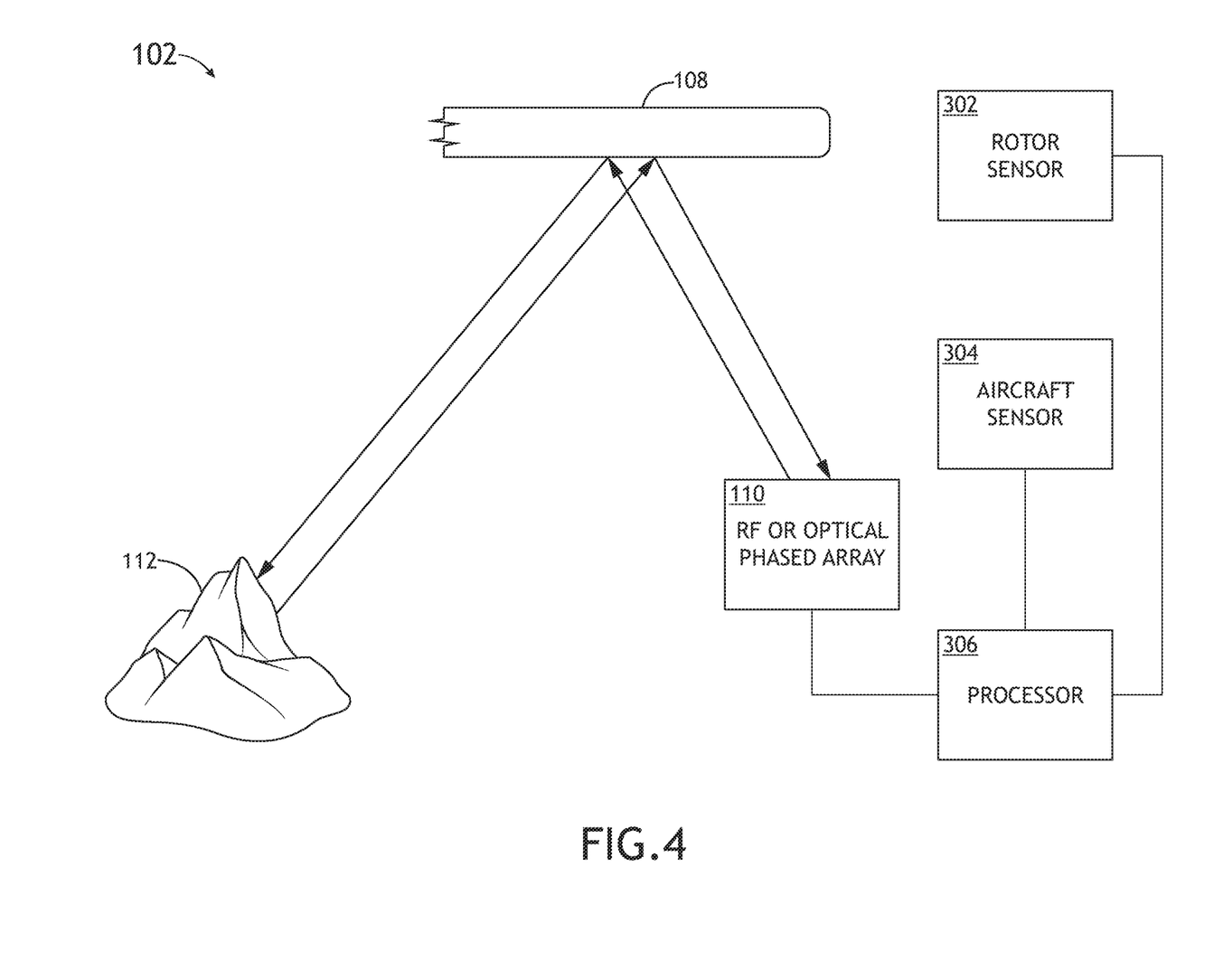
FIG. 4 is a view of an exemplary embodiment of the system of FIG. 1 according to the inventive concepts disclosed herein.

In some embodiments, as shown in FIGS. 3-4, the aircraft 102 may further include at least one rotor sensor 302, at least one aircraft sensor 304, at least one processor 306, memory, and/or the phased array 110, some or all of which may be communicatively coupled at any given time. In some embodiments, the at least one processor 306 may be implemented as part of a single computing device or distributed among any number of computing devices configured to perform (e.g., collectively perform if more than one computing device and processor) any or all of the operations disclosed throughout.

For example, the phased array 110 may be configured to at least one of transmit electromagnetic (EM) energy in a direction toward the rotor blades 108 or receive EM energy in a direction from the rotor blades 108. In some embodiments, the phased array 110 may be configured for analog beamforming (e.g., a single beam) and/or digital beamforming (e.g., one or multiple beams). In some embodiments, where the phased array 110 is an optical phased array, each of at least one of the rotor blades 108 may include at least one optically reflective surface for the transmitted EM energy to reflect off. In some embodiments, where the phased array 110 is an optical phased array and/or uses micromirrors, the optical phased array may have at least one steerable laser. Such optical phased array applications may be configured for light detection and ranging (LIDAR) and/or optical over-the-air (OTA) communications.

For example, the at least one rotor sensor 302 may be configured to provide rotor sensor data to be used to at least one of determine or obtain the rotor blade information (e.g., at least one location and/or at least one angle of the rotor blades 108 at a given or an expected time). For example, the angle of a rotor blade 108 can be used to determine an angle of reflection off the rotor blade 108. For example, the at least one rotor sensor 302 may include a motor encoder and a blade angle sensor. The motor encoder may provide information on a position of the rotor blades 108. The blade angle sensor may provide information of the blade angles. For example, a camber of the rotor blades 108 may be used to direct reflected EM energy.

For example, the at least one aircraft sensor 304 may be configured to provide aircraft data to be used to at least one of determine or obtain the aircraft information (e.g., a position and/or orientation of the aircraft at a given or expected time).

For example, the at least one processor 306 may include at least one central processing unit (CPU), at least one graphics processing unit (GPU), at least one field-programmable gate array (FPGA), at least one application specific integrated circuit (ASIC), at least one digital signal processor, at least one virtual machine (VM) running on at least one processor, and/or the like configured to perform (e.g., collectively perform if more than one processor) and/or cause (e.g., collectively cause) to be performed any of the operations disclosed throughout. The processor 306 may be configured to run various software applications or computer code stored (e.g., maintained) in a non-transitory computer-readable medium (e.g., memory) and configured to execute various instructions or operations. The processor 306 may be configured to perform any or all of the operations disclosed throughout. For example, the processor 306 may be configured to: at least one of determine or obtain rotor blade information (e.g., based at least on rotor sensor data received from the rotor sensor 302), the rotor blade information including at least one location and/or at least one angle of the rotor blades 108 (e.g., at a given or an expected time); at least one of determine or obtain aircraft information (e.g., based at least on aircraft sensor data received from the aircraft sensor 304 and/or on information collected from pilot controls, for example, which may be used to calculate an angle of attack), the aircraft information including a position and an orientation of the aircraft 102; based at least on the rotor blade information and the aircraft information, determine (a) at least one time to at least one of transmit EM energy or receive EM energy and (b) at least one angle to at least one of transmit EM energy or receive EM energy; and/or based at least on the rotor blade information and the aircraft information, control the phased array 110 to adjust at least one beam pointing angle of the phased array 110 to one or more of the at least one angle and to transmit EM energy for a particular duration at the at least one adjusted beam pointing angle.

For example, based at least on such operations performed by the processor 306, the phased array 110 may be configured to transmit EM energy for the particular duration at the at least one adjusted beam pointing angle, wherein the transmitted EM energy is configured to reflect off at least one of the rotor blades 108 toward at least one target (e.g., 112, 114, 116, 118, and/or 120). In some embodiments, the phased array 110 may be a radiofrequency (RF) phased array, wherein the transmitted EM energy is further configured to reflect off the at least one target (e.g., 112, 116, and/or 118) back toward at least one of the rotor blades 108, reflect off at least one of the rotor blades 108, and be received by the phased array 110 as reflected EM energy, wherein the phased array 110 may be configured to measure the reflected EM energy, wherein the processor 306 may be further configured to calculate a range to the at least one target (e.g., 112, 116, and/or 118) based at least on the measured reflected EM energy. In some embodiments, the transmitted EM energy includes at least one communication signal, wherein the at least one target (e.g., 114, 118, and/or 120) is at least one communication target.

In some embodiments, the processor 306 may be further configured to: determine whether to-be-transmitted or to-be-received EM energy is to dodge the rotor blades 108 or to reflect off at least one of the rotor blades 108. In some embodiments, the processor 306 may be further configured to: determine that to-be-transmitted or to-be-received EM energy is to dodge the rotor blades, wherein the to-be-transmitted or the to-be-received EM energy includes at least one communication signal to or from the satellite 120.

In some embodiments, the processor 306 may be further configured to: obtain or determine a timing of the rotor blades 108; cause EM energy to reflect off the rotor blade in a downward facing angle; calculate geometry for use in obtaining a desired direction for EM energy receive and/or transmit functions; and/or control the phased array 110 to point at a specific point of a rotor blade 108 to achieve a desired angle.

Figure 5:
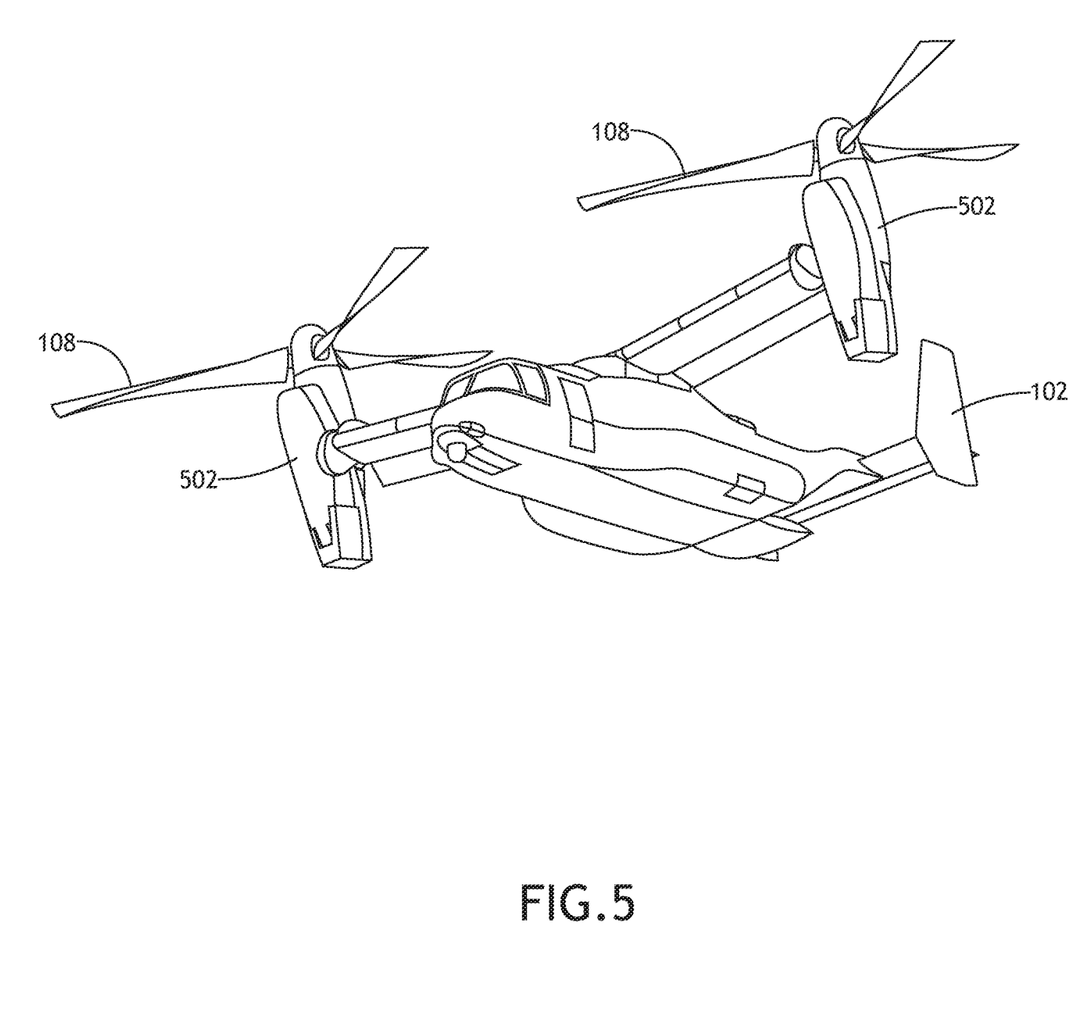
FIG. 5 is a view of an exemplary embodiment of an aircraft of the system of FIG. 1 according to the inventive concepts disclosed herein.
Figure 6:
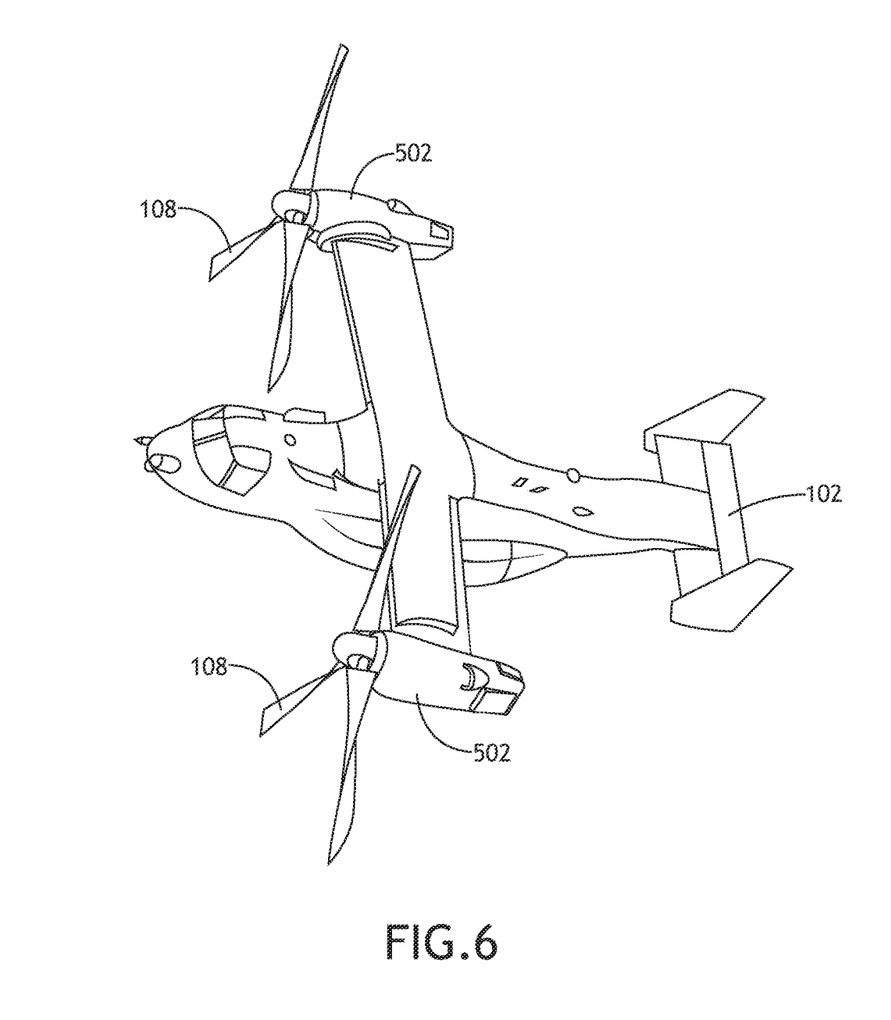
FIG. 6 is a view of an exemplary embodiment of the aircraft of FIG. 5 according to the inventive concepts disclosed herein.

Referring now to FIGS. 5-6, an exemplary embodiment of an aircraft 102 is shown. The aircraft 102 (e.g., a vertical takeoff and landing aircraft (e.g., V-22 Osprey)) may have positionable rotor blades 108, such as for operating in a vertical takeoff and/or landing situation (as shown in FIG. 5) or for operating in a forward flight situation (as shown in FIG. 6). The aircraft 102 may include rotor pivot members 502 configured to adjust a position of the rotors 106 and rotor blades 108, such as between a forward flight rotor position (as shown in FIG. 6) or a vertical takeoff and landing rotor position (as shown in FIG. 5).

Figure 7:
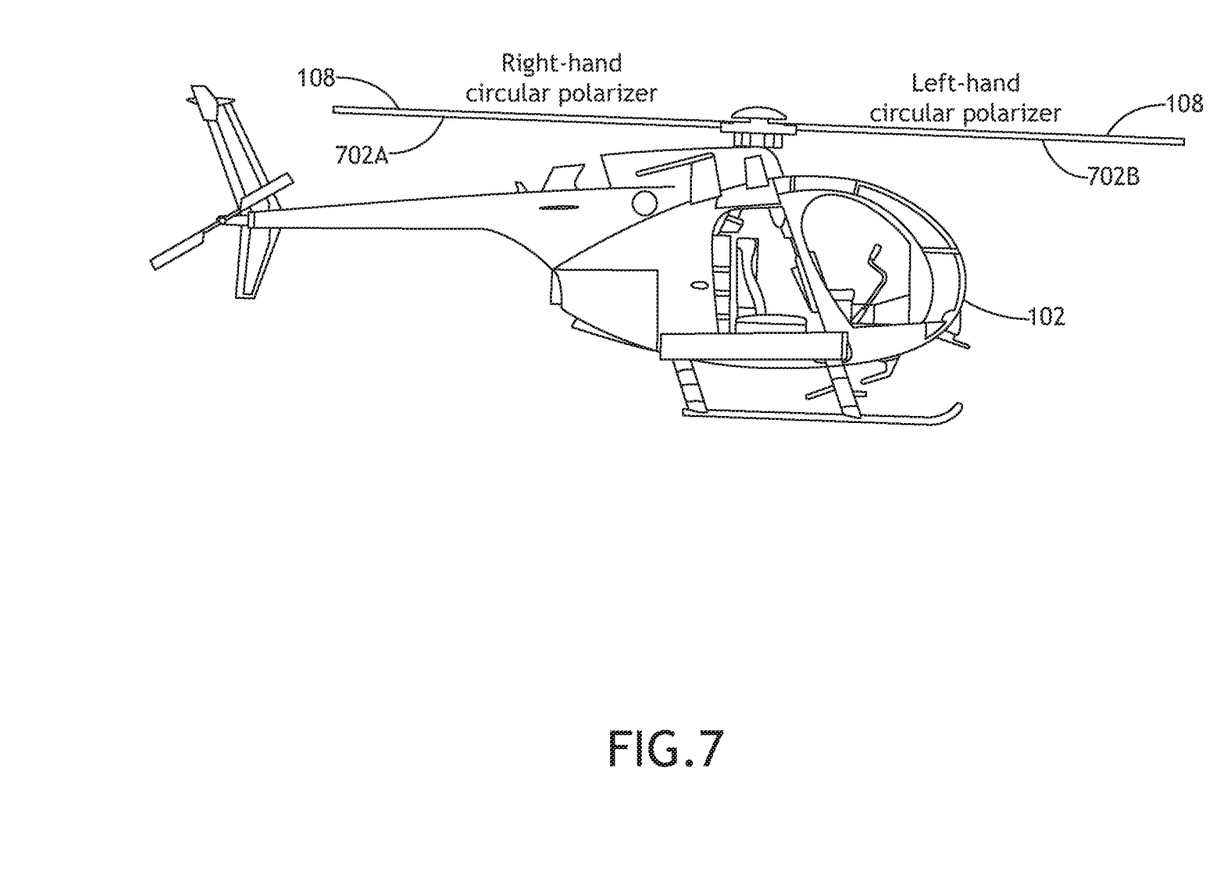
FIG. 7 is a view of an exemplary embodiment of an aircraft of the system of FIG. 1 according to the inventive concepts disclosed herein.

Referring now to FIG. 7, an exemplary embodiment of an aircraft 102 is shown. At least one of the rotor blades 108 may include at least one polarizer for the transmitted EM energy to reflect off while imparting at least one polarization to the transmitted EM energy. For example, a first rotor blade 108 of the rotor blades 108 may include a right-hand polarizer 702A for the transmitted EM energy to reflect off and impart a right-hand polarization to the transmitted EM energy, and a second rotor blade 108 of the rotor blades 108 may include a left-hand polarizer 702B for the transmitted EM energy to reflect off and impart a left-hand polarization to the transmitted EM energy. In this instance, the processor 306 would delay transmission until the correct polarizer 702A or 702B is in position.

Figure 8:
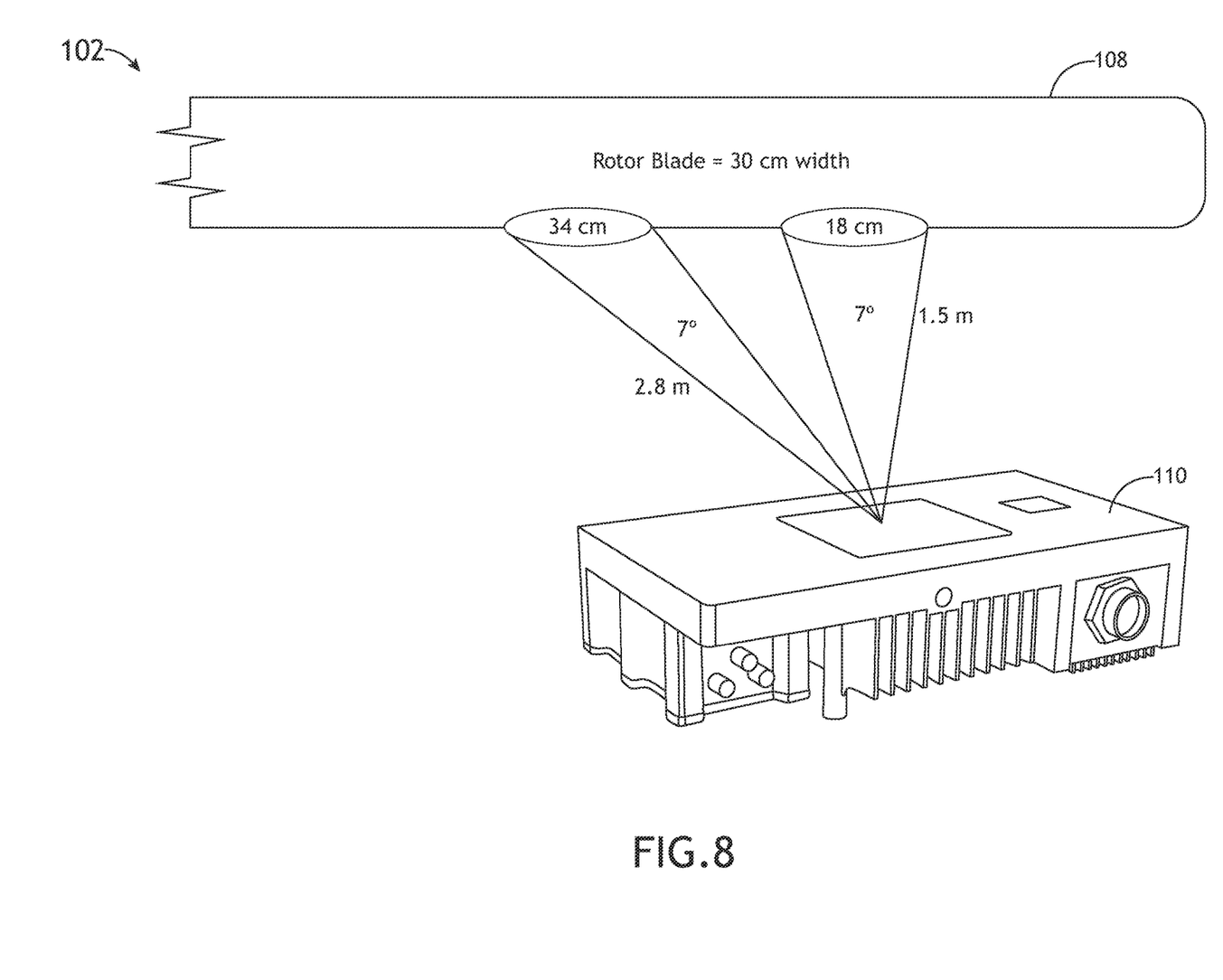
FIG. 8 is a view of an exemplary embodiment of an aircraft of the system of FIG. 1 according to the inventive concepts disclosed herein.

Referring now to FIG. 8, a size of an EM energy beam transmitted from the phased array 110 may be small enough to stay on a width of the rotor blade 108 at many angles. For example, a rotor blade width can be approximately 30 centimeters (cm). For example, a width of beam from a phased array 110 positioned on the spine 104 of the aircraft 102 can project a beam that is between 18 cm and 34 cm wide depending on a beam forming angle (e.g., approximately 7 degrees) and where on the rotor blade 108 that the beam reflects off.

Figure 9:
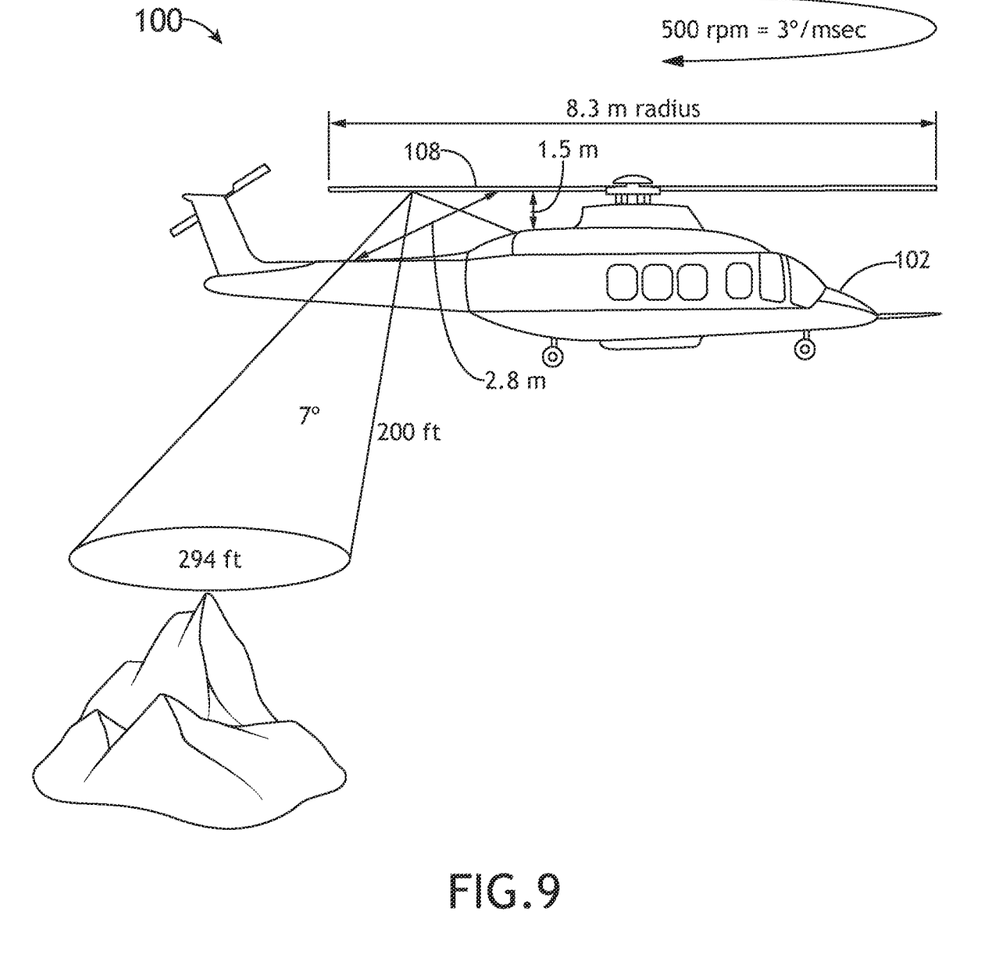
FIG. 9 is a view of an exemplary embodiment of the system of FIG. 1 according to the inventive concepts disclosed herein.

Referring now to FIG. 9, by way of example, a size of an EM energy beam transmitted from the phased array 110 that reflects off the rotor blade 108 and onto a radar target 112 (e.g., a hazard) may fit within the beam width that is approximately 294 feet in diameter, for example, based at least on an exemplary set of factors: 7 degree beam angle, 200 vertical feet from the radar target 112 to the rotor blade 108, and 1.5 meters (m) from phased array 110 to rotor blade 108.

Figure 10:
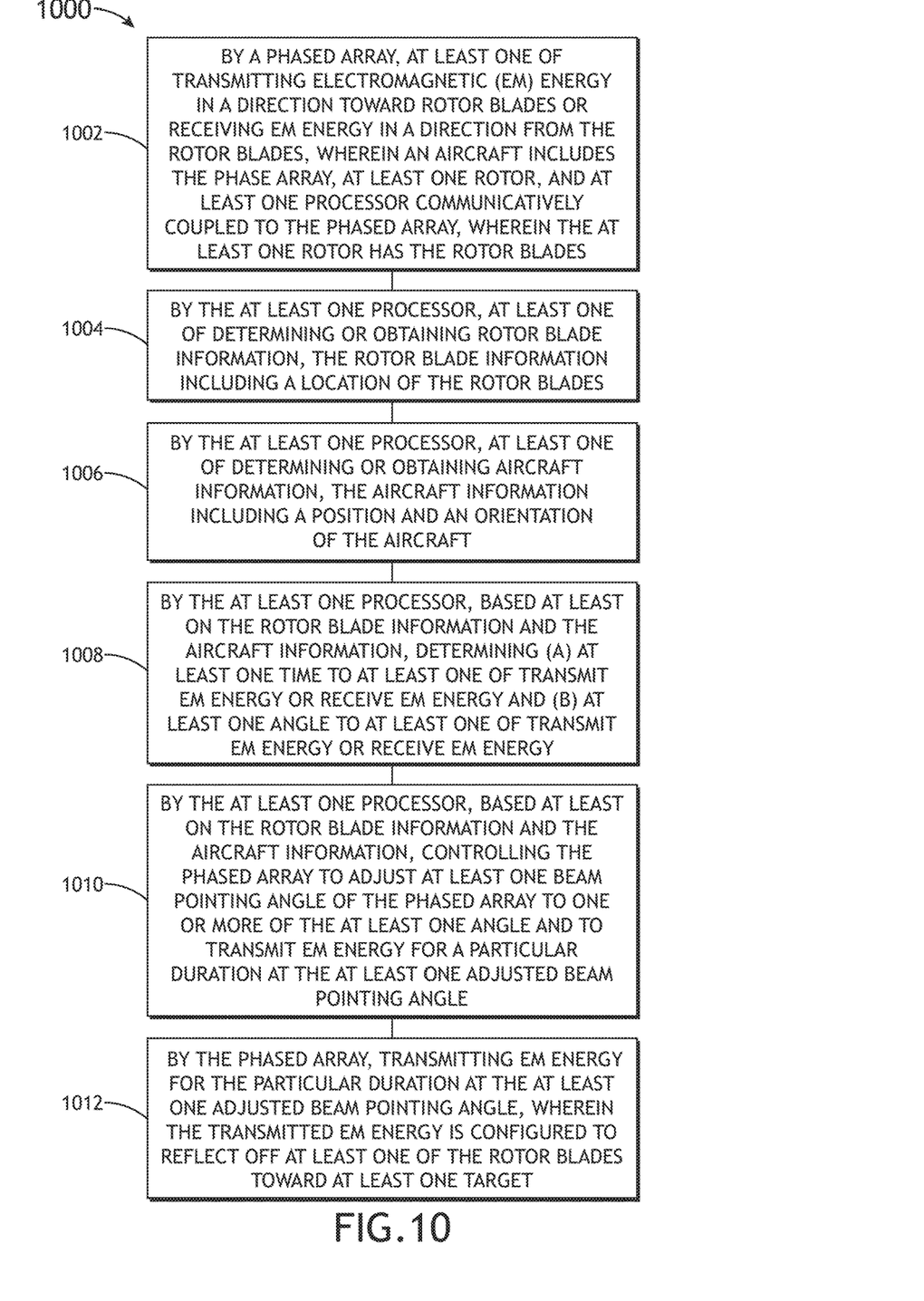
FIG. 10 is a diagram of an exemplary embodiment of a method according to the inventive concepts disclosed herein.

Referring now to FIG. 10, an exemplary embodiment of a method 1000 according to the inventive concepts disclosed herein may include one or more of the following steps. Additionally, for example, some embodiments may include performing one or more instances of the method 1000 iteratively, concurrently, and/or sequentially. Additionally, for example, at least some of the steps of the method 1000 may be performed in parallel and/or concurrently. Additionally, in some embodiments, at least some of the steps of the method 1000 may be performed non-sequentially.

A step 1002 may include by a phased array, at least one of transmitting electromagnetic (EM) energy in a direction toward rotor blades or receiving EM energy in a direction from the rotor blades, wherein an aircraft includes the phase array, at least one rotor, and at least one processor communicatively coupled to the phased array, wherein the at least one rotor has the rotor blades.

A step 1004 may include by the at least one processor, at least one of determining or obtaining rotor blade information, the rotor blade information including at least one location of the rotor blades.

A step 1006 may include by the at least one processor, at least one of determining or obtaining aircraft information, the aircraft information including a position and an orientation of the aircraft.

A step 1008 may include by the at least one processor, based at least on the rotor blade information and the aircraft information, determining (a) at least one time to at least one of transmit EM energy or receive EM energy and (b) at least one angle to at least one of transmit EM energy or receive EM energy.

A step 1010 may include by the at least one processor, based at least on the rotor blade information and the aircraft information, controlling the phased array to adjust at least one beam pointing angle of the phased array to one or more of the at least one angle and to transmit EM energy for a particular duration at the at least one adjusted beam pointing angle.

A step 1012 may include by the phased array, transmitting EM energy for the particular duration at the at least one adjusted beam pointing angle, wherein the transmitted EM energy is configured to reflect off at least one of the rotor blades toward at least one target.

Further, the method 1000 may include any of the operations disclosed throughout.

As will be appreciated from the above, embodiments of the inventive concepts disclosed herein may be directed to a method and a system (e.g., an aircraft system) including a phased array configured to at least one of transmit electromagnetic (EM) energy in a direction toward the rotor blades or receive EM energy in a direction from the rotor blades, wherein the transmitted and/or received EM energy at least one of dodges the rotor blades or reflects off the rotor blades.

As used throughout and as would be appreciated by those skilled in the art, "at least one non-transitory computer-readable medium" may refer to as at least one non-transitory computer-readable medium (e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   an aircraft, comprising:
      at least one rotor having rotor blades;
      a phased array configured to at least one of transmit electromagnetic (EM) energy in a direction toward the rotor blades or receive EM energy in a direction from the rotor blades; and
      at least one processor communicatively coupled to the phased array, the at least one processor configured to:
         at least one of determine or obtain rotor blade information, the rotor blade information including at least one location of the rotor blades;
         at least one of determine or obtain aircraft information, the aircraft information including a position and an orientation of the aircraft;
         based at least on the rotor blade information and the aircraft information, determine (a) at least one time to at least one of transmit EM energy or receive EM energy and (b) at least one angle to at least one of transmit EM energy or receive EM energy; and
         based at least on the rotor blade information and the aircraft information, control the phased array to adjust at least one beam pointing angle of the phased array to one or more of the at least one angle and to transmit EM energy for a particular duration at the at least one adjusted beam pointing angle;

wherein the phased array is configured to transmit EM energy for the particular duration at the at least one adjusted beam pointing angle, wherein the transmitted EM energy is configured to reflect off at least one of the rotor blades toward at least one target;

wherein at least one of the rotor blades includes at least one polarizer for the transmitted EM energy to reflect off while imparting at least one polarization to the transmitted EM energy.

2. The system of claim 1, wherein the phased array is a radiofrequency (RF) phased array, wherein the transmitted EM energy is further configured to reflect off the at least one target back toward at least one of the rotor blades, reflect off at least one of the rotor blades, and be received by the phased array as reflected EM energy, wherein the phased array is configured to measure the reflected EM energy, wherein the processor is configured to calculate a range to the at least one target based at least on the measured reflected EM energy.

3. The system of claim 1, the transmitted EM energy includes at least one communication signal, wherein the at least one target is at least one communication target.

4. The system of claim 1, wherein the phased array is a radiofrequency (RF) phased array.

5. The system of claim 1, wherein the phased array is an optical phased array.

6. The system of claim 5, wherein at least one of the rotor blades includes at least one optically reflective surface for the transmitted EM energy to reflect off.

7. The system of claim 1, wherein the at least one processor is further configured to determine whether to-be-transmitted or to-be-received EM energy is to dodge the rotor blades or to reflect off at least one of the rotor blades.

8. The system of claim 7, wherein the at least one processor is further configured to determine that the to-be-transmitted or the to-be-received EM energy is to dodge the rotor blades.

9. The system of claim 8, wherein the to-be-transmitted or the to-be-received EM energy includes at least one communication signal to or from a satellite.

10. The system of claim 1, wherein the rotor blade information further includes at least one angle of the rotor blades.

11. The system of claim 1, wherein the aircraft is a helicopter, wherein the phased array is located on a fuselage or engine cowling of the helicopter.

12. The system of claim 1, wherein the aircraft further comprises at least one rotor sensor configured to provide rotor sensor data to be used to at least one of determine or obtain the rotor blade information.

13. The system of claim 1, wherein a first rotor blade of the rotor blades includes a right-hand circular polarizer for the transmitted EM energy to reflect off and impart a right-hand circular polarization to the transmitted EM energy, wherein a second rotor blade of the rotor blades includes a left-hand circular polarizer for the transmitted EM energy to reflect off and impart a left-hand circular polarization to the transmitted EM energy.

14. A method, comprising:
by a phased array, at least one of transmitting electromagnetic (EM) energy in a direction toward rotor blades or receiving EM energy in a direction from the rotor blades, wherein an aircraft includes the phased array, at least one rotor, and at least one processor communicatively coupled to the phased array, wherein the at least one rotor has the rotor blades;

by the at least one processor, at least one of determining or obtaining rotor blade information, the rotor blade information including at least one location of the rotor blades;

by the at least one processor, at least one of determining or obtaining aircraft information, the aircraft information including a position and an orientation of the aircraft;

by the at least one processor, based at least on the rotor blade information and the aircraft information, determining (a) at least one time to at least one of transmit EM energy or receive EM energy and (b) at least one angle to at least one of transmit EM energy or receive EM energy;

by the at least one processor, based at least on the rotor blade information and the aircraft information, controlling the phased array to adjust at least one beam pointing angle of the phased array to one or more of the at least one angle and to transmit EM energy for a particular duration at the at least one adjusted beam pointing angle; and by the phased array, transmitting EM energy for the particular duration at the at least one adjusted beam pointing angle, wherein the transmitted EM energy is configured to reflect off at least one of the rotor blades toward at least one target;

wherein at least one of the rotor blades includes at least one polarizer for the transmitted EM energy to reflect off while imparting at least one polarization to the transmitted EM energy.

15. A system, comprising:
an aircraft, comprising:
at least one rotor having rotor blades;
a phased array configured to at least one of transmit electromagnetic (EM) energy in a direction toward the rotor blades or receive EM energy in a direction from the rotor blades; and
at least one processor communicatively coupled to the phased array, the at least one processor configured to:
at least one of determine or obtain rotor blade information, the rotor blade information including at least one location of the rotor blades;
at least one of determine or obtain aircraft information, the aircraft information including a position and an orientation of the aircraft;
based at least on the rotor blade information and the aircraft information, determine (a) at least one time to at least one of transmit EM energy or receive EM energy and (b) at least one angle to at least one of transmit EM energy or receive EM energy; and
based at least on the rotor blade information and the aircraft information, control the phased array to adjust at least one beam pointing angle of the phased array to one or more of the at least one angle and to transmit EM energy for a particular duration at the at least one adjusted beam pointing angle;
wherein the phased array is configured to transmit EM energy for the particular duration at the at least one adjusted beam pointing angle, wherein the transmitted EM energy is configured to reflect off at least one of the rotor blades toward at least one target;
wherein a first rotor blade of the rotor blades includes a right-hand circular polarizer for the transmitted EM energy to reflect off and impart a right-hand circular polarization to the transmitted EM energy, wherein a second rotor blade of the rotor blades includes a left-hand circular polarizer for the transmitted EM energy to reflect off and impart a left-hand circular polarization to the transmitted EM energy.

\* \* \* \* \*